United States Patent
Kagayama (10) Patent No.: US 9,490,088 B2
(45) Date of Patent: *Nov. 8, 2016

(54) TACTILE PRESENTATION DEVICE

(71) Applicant: MURATA MANUFACTURING CO., LTD., Nagaokakyo-shi, Kyoto-Fu (JP)

(72) Inventor: Kenji Kagayama, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 43 days.

This patent is subject to a terminal disclaimer.

(21) Appl. No.: 14/315,779

(22) Filed: Jun. 26, 2014

(65) Prior Publication Data

US 2014/0305783 A1 Oct. 16, 2014

Related U.S. Application Data

(63) Continuation of application No. PCT/JP2012/083003, filed on Dec. 20, 2012.

(30) Foreign Application Priority Data

Dec. 27, 2011 (JP) ................................. 2011-284816

(51) Int. Cl.
*H01H 3/60* (2006.01)
*H01H 13/85* (2006.01)
*G06F 3/01* (2006.01)
*G06F 3/0338* (2013.01)

(52) U.S. Cl.
CPC .............. *H01H 13/85* (2013.01); *G06F 3/016* (2013.01); *G06F 3/0338* (2013.01); *H01H 2215/052* (2013.01)

(58) Field of Classification Search
CPC .................. H01H 2221/044; H01H 2221/016
See application file for complete search history.

(56) References Cited

U.S. PATENT DOCUMENTS

| 8,174,511 B2 * | 5/2012 | Takenaka ................ G06F 3/016 345/104 |
| 2006/0250377 A1 | 11/2006 | Zadesky et al. |
| 2008/0055277 A1 * | 3/2008 | Takenaka .............. G06F 3/0488 345/177 |
| 2010/0090813 A1 * | 4/2010 | Je ............................ G06F 3/016 340/407.2 |

(Continued)

FOREIGN PATENT DOCUMENTS

| JP | 2008-59027 A | 3/2008 |
| JP | 2008-181365 A | 8/2008 |

(Continued)

OTHER PUBLICATIONS

Written Opinion and International Search Report issued in PCT/JP2012/083003 mailed in Feb. 19, 2013.

*Primary Examiner* — Renee Luebke
*Assistant Examiner* — Ahmed Saeed
(74) *Attorney, Agent, or Firm* — Arent Fox LLP (57) ABSTRACT

A tactile presentation device has a chassis having a top surface chassis, a bottom surface chassis, and an inner space, a button type operation unit fixed to the top surface chassis and having an operation surface, an actuator arranged in the inner space, and a vibration transmission member arranged between the actuator and the button type operation unit. The top surface chassis has a top surface having a top surface opening exposing the operation surface of the button type operation unit to outside, and a side surface formed along the peripheral edge of the top surface. The actuator is fixed to the side surface of the top surface chassis.

17 Claims, 6 Drawing Sheets

(56) References Cited

U.S. PATENT DOCUMENTS

| | | | |
|---|---|---|---|
| 2013/0222319 A1* | 8/2013 | Tsurusaki | G06F 1/1626 345/173 |
| 2014/0209445 A1* | 7/2014 | Iwawaki | G06F 3/016 200/600 |
| 2014/0305783 A1* | 10/2014 | Kagayama | G06F 3/016 200/521 |
| 2014/0306914 A1* | 10/2014 | Kagayama | G06F 3/016 345/173 |
| 2015/0009176 A1* | 1/2015 | Inata | G06F 3/016 345/174 |

FOREIGN PATENT DOCUMENTS

| | | | | |
|---|---|---|---|---|
| JP | 2008-532115 A | 8/2008 | | |
| JP | 2009-077502 A | 9/2009 | | |
| JP | 2010-152889 A | 7/2010 | | |
| JP | 2011-107879 A | 6/2011 | | |
| KR | EP 1389787 A2 * | 2/2004 | | H01H 3/60 |

* cited by examiner

TACTILE PRESENTATION DEVICE

CROSS REFERENCE TO RELATED APPLICATIONS

The present application is a continuation of PCT/JP2012/083003 filed Dec. 20, 2012, which claims priority to Japanese Patent Application No. 2011-284816, filed Dec. 27, 2011, the entire contents of each of which are incorporated herein by reference.

FIELD OF THE INVENTION

The present invention relates to a tactile presentation device which provides a tactile sense to an operator according to an operation.

BACKGROUND OF THE INVENTION

Figure 14:
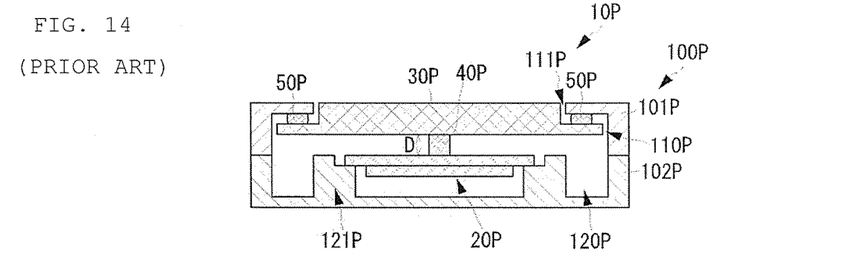
FIG. 14 is a cross-sectional view showing the structure of a conventional tactile presentation device 10P.

Conventionally, various tactile presentation devices have been contrived which provide a tactile sense, such as vibration, to the finger of an operator according to an operation input when the finger of the operator directly touches an operation input unit, such as a touch panel or a button. For instance, Patent Literature 1 describes a portable electronic device as a tactile presentation device. The tactile presentation device has a basic structure as shown in FIG. 14. FIG. 14 is a cross-sectional view showing the structure of a conventional tactile presentation device 10P. FIG. 14 shows the cross section of the tactile presentation device 10P in a plane parallel to the side surface thereof.

The tactile presentation device 10P has a chassis 100P including a top surface chassis 101P and a bottom surface chassis 102P. The top surface chassis 101P has a top surface on the operation surface side, a side surface orthogonal to the top surface, and a top surface inner space 110P. The bottom surface chassis 102P has a bottom surface opposite to the top surface of the top surface chassis 101P, a side surface orthogonal to the bottom surface, and a bottom surface inner space 120P. The side surfaces of the top surface chassis 101P and the bottom surface chassis 102P are joined to each other. The top surface inner space 110P and the bottom surface inner space 120P thus communicate with each other. With this structure, the chassis 100P has an inner space having a predetermined area.

Openings 111P are formed in the top surface of the top surface chassis 101P. An operation input unit 30P is arranged in the top surface inner space 110P of the top surface chassis 101P. The operation input unit 30P is a touch panel. The operation input unit 30P has an operation input surface exposed from the openings 111P to outside. The operation input unit 30P is mounted over the top surface chassis 101P via buffer materials 50P.

A holding member 121P is formed in the bottom surface inner space 120P of the bottom surface chassis 102P. The holding member 121P is projected from the bottom surface. A planar actuator 20P is held by the holding member 121P. The actuator 20P has a planar base substrate, and a planar piezoelectric element. Driving electrodes are formed on the piezoelectric element. The actuator 20P is held so that the planar surface of the base substrate is parallel to the operation input surface of the operation input unit 30P. The actuator 20P is held at the ends of the base substrate so that the base substrate is opposite to the operation input unit 30P and that the piezoelectric element is opposite to the bottom surface of the bottom surface chassis 102P.

A pad 40P is arranged between the surface of the actuator 20P on the operation input unit 30P side and the surface of the operation input unit 30P on the actuator 20P side. Height D of the pad 40P is previously set at the time of designing to coincide with the interval between the operation input unit 30P and the actuator 20P.

When the actuator 20P is driven, vibration is caused in the direction orthogonal to the planar surface of the base substrate. The vibration is transmitted via the pad 40P to the operation input unit 30P. The vibration transmitted to the operation input unit 30P is transmitted to an operator from his/her finger which touches the operation input unit 30P. With this, a predetermined tactile sense is presented to the operator.

PTL1: Japanese Patent Application Laid-Open (JP-A) No. 2010-152889

Figure 15:
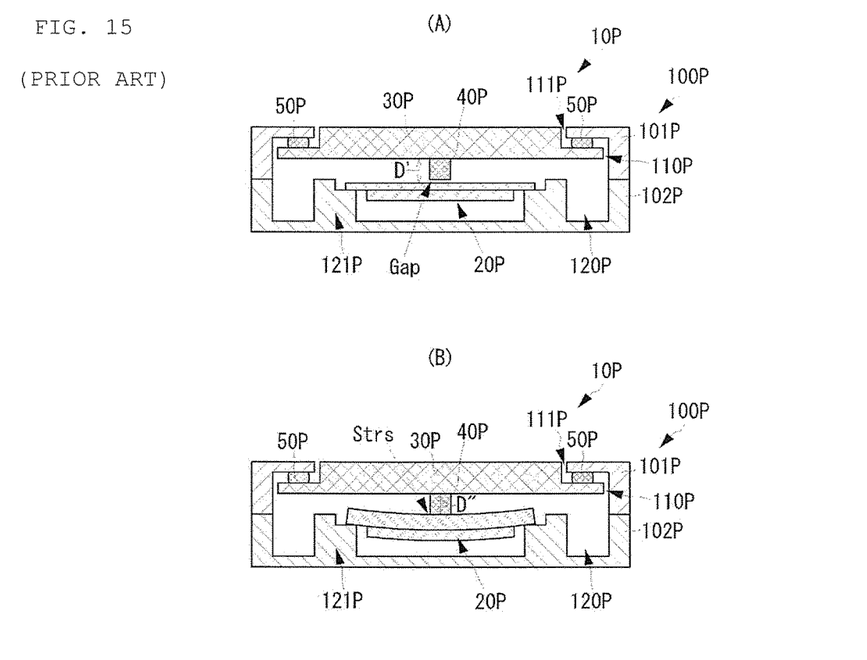
FIGS. 15A and 15B are cross-sectional views of assistance in explaining the problems in the structure of the conventional tactile presentation device 10P.

However, in the conventional tactile presentation device 10P as shown in FIG. 14, the following problems arise. FIGS. 15A and 15B are cross-sectional views of assistance in explaining the problems in the structure of the conventional tactile presentation device 10P. In FIG. 15A, the base substrate of the actuator 20P is thinner than the predetermined thickness. In FIG. 15B, the base substrate of the actuator 20P is thicker than the predetermined thickness. As in FIG. 14, each of FIGS. 15A and 15B shows the cross section of the tactile presentation device 10P in a plane parallel to the side surface thereof.

As shown in FIG. 15A, when the base substrate of the actuator 20P is thinner than the predetermined thickness, interval D' between the actuator 20P and the operation input unit 30P is more than height D of the pad 40P (D'>D). Consequently, for instance, when the operation input unit 30P and the pad 40P are bonded to each other, as shown in FIG. 15A, gap Gap is caused between the pad 40P and the actuator 20P. With this, even when the actuator 20P is driven to cause vibration, the pad 40P is not contacted with the base substrate of the actuator 20P. The vibration cannot be transmitted to the operation input unit 30P.

As shown in FIG. 15B, when the base substrate of the actuator 20P is thicker than the predetermined thickness, interval D" between the actuator 20P and the operation input unit 30P is less than height D of the pad 40P (D"<D). Consequently, as shown in FIG. 15B, load Strs is applied to warp the actuator 20P. The actuator 20P can be broken according to the magnitude of load Strs.

The above problems also arise when the height of the side surfaces of the top surface chassis 101P and the bottom surface chassis 102P is different from the desired height, when height D of the pad 40P is different from the desired height, and when the height of the holding member 121P of the bottom surface chassis 102P is different from the desired height. In the conventional structure, when the manufacture dimension accuracy of the components structuring the tactile presentation device, in particular, the manufacture dimension accuracy of the chassis 100P and the actuator 20P, is not high, vibration caused in the actuator 20P cannot be reliably transmitted to the operation input unit 30P and the actuator 20P can be broken.

SUMMARY OF THE INVENTION

An object of the present invention is to provide a tactile presentation device which can reliably provide a tactile sense to an operator and have a very low breakage possibility.

A tactile presentation device of the present invention has a chassis having a top surface chassis, a bottom surface chassis, and an inner space, a button type operation unit fixed to the top surface chassis and having an operation surface, an actuator arranged in the inner space, and a vibration transmission member arranged between the actuator and the button type operation unit. The top surface chassis has a top surface having a top surface opening exposing the operation surface of the button type operation unit to outside, and a side surface formed along the peripheral edge of the top surface. The actuator is fixed to the side surface of the top surface chassis.

Unlike the conventional tactile presentation device, in this structure, the problem that vibration cannot be transmitted to the button type operation unit without the actuator being contacted with the pad due to manufacture variation in the base substrate of the actuator and the problem that the actuator to which a load is applied is warped and broken do not arise. As a result, a tactile sense can be reliably presented. The tactile presentation device can thus have high reliability.

In the tactile presentation device of the present invention, preferably, the vibration transmission member is arranged so that at least one end thereof is abutted onto the actuator. In particular, preferably, the actuator has a piezoelectric element, and the vibration transmission member has a height equal to the distance between a plane including the surface of the button type operation unit opposite to the actuator and a plane including the surface of the actuator opposite to the side on which the piezoelectric element is arranged. Alternatively, preferably, the actuator has a piezoelectric element, and the vibration transmission member has a height less than the distance between a plane including the surface of the button type operation unit opposite to the actuator and a plane including the surface of the actuator opposite to the side on which the piezoelectric element is arranged.

In the tactile presentation device of the present invention, preferably, the actuator in planar shape has a planar surface, a portion of the surface thereof opposite to the button type operation unit being fixed to the top surface chassis.

In particular, preferably, the button type operation unit has a planar base member, at least one projected portion being integral with the base member and being exposed from the top surface opening to outside, the planar surface of the actuator and the planar surface of the base member are substantially parallel to each other, and the actuator has a vibration mode in which the direction orthogonal to the planar surfaces is a vibration direction.

In the tactile presentation device of the present invention, preferably, the base member has a raised portion at the substantially center thereof opposite to the actuator. In this structure, the base member, that is, the button type operation unit, is easily turned.

In the tactile presentation device of the present invention, preferably, the vibration transmission member is abutted onto the center position of the actuator in plan view, and the peripheral edge of the actuator is fixed to the top surface chassis.

In particular, preferably, the side surface of the top surface chassis has the portion thereof on the peripheral edge side of the top surface and the portion thereof on the center side of the top surface, the portion thereof on the peripheral edge side of the top surface being thicker than the portion thereof on the center side of the top surface, the portion thereof on the center side of the top surface having a first fixing surface parallel to the top surface, and the peripheral edge of the actuator is fixed to the first fixing surface.

Further, preferably, the vibration transmission member has a height equal to the distance between a plane including the surface of the button type operation unit opposite to the actuator and a plane including the first fixing surface. In addition, preferably, the vibration transmission member has a height less than the distance between a plane including the surface of the button type operation unit opposite to the actuator and a plane including the first fixing surface.

In the tactile presentation device of the present invention, preferably, the vibration transmission member has insulation properties.

In this structure, a driving voltage applied to the actuator can be prevented from being propagated to the button type operation unit without insulating shield. With this, size increase due to insulation can be prevented.

Preferably, the tactile presentation device of the present invention further has a reinforcement member arranged between and spaced from the actuator and the button type operation unit and having a through-hole inserting the vibration transmission member therethrough, and the actuator is fixed to the top surface chassis via the reinforcement member.

In this structure, the reinforcement member can limit excessive pressing of the button type operation unit and warping of the actuator due to an abrupt external shock to the tactile presentation device to reduce breakage of the actuator.

In particular, preferably, the interval between the actuator and the reinforcement member, the interval between the button type operation unit and the reinforcement member, and the interval obtained by subtracting, from the height of the vibration transmission member, the distance between the actuator and the reinforcement member and the thickness of the reinforcement member are equal to or less than the maximum allowable warping amount of the actuator.

In this structure, breakage of the actuator due to warping can be prevented.

Further, preferably, the reinforcement member is integral with the top surface chassis.

In this structure, the number of components of the tactile presentation device can be reduced.

In the tactile presentation device of the present invention, preferably, the reinforcement member has a raised portion abutted onto the button type operation unit.

In this structure, the base member, that is, the button type operation unit, is easily to be turned.

According to the present invention, the tactile presentation device can reliably provide a tactile sense to an operator and have a very low breakage possibility.

DETAILED DESCRIPTION OF THE EXEMPLARY EMBODIMENTS

Figure 1:
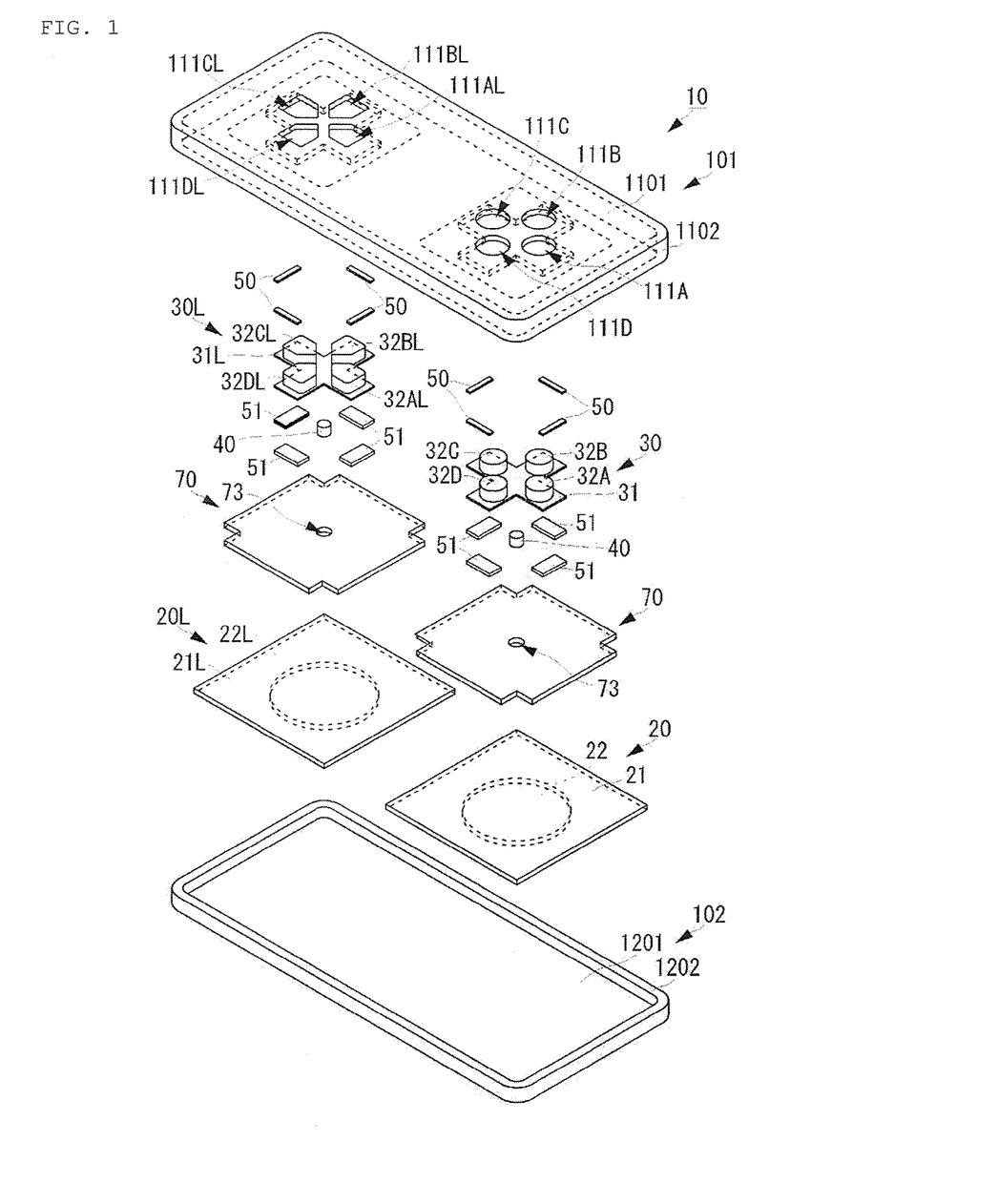
FIG. 1 is an exploded perspective view of a tactile presentation device 10 according to a first embodiment of the present invention.
Figure 2:
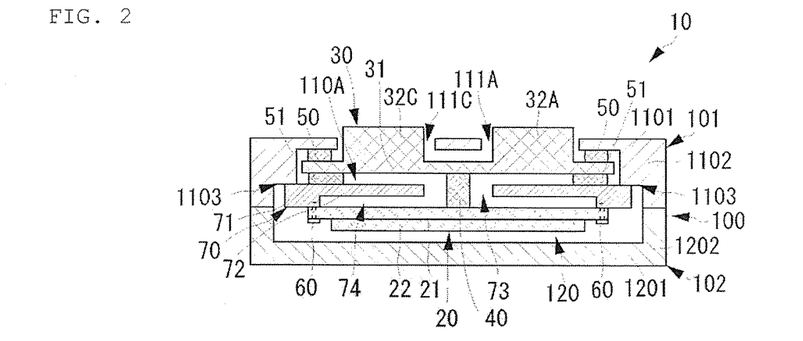
FIG. 2 is a cross-sectional view showing the structure of the tactile presentation device 10 according to the first embodiment of the present invention.

A tactile presentation device according to a first embodiment of the present invention will be described with reference to the drawings. FIG. 1 is an exploded perspective view of a tactile presentation device 10 according to the first embodiment of the present invention. FIG. 2 is a cross-sectional view of the structure of the tactile presentation device 10 according to the first embodiment of the present invention. FIG. 2 shows the cross section of the tactile presentation device 10 in a plane parallel to the side surface thereof. In FIG. 1, the tactile presentation device 10 has two button type operation units. In FIG. 2, the tactile presentation device 10 has one button type operation unit.

The tactile presentation device 10 has actuators 20 and 20L, button type operation units 30 and 30L, pads 40, reinforcement members 70, and a chassis 100. The button type operation unit 30 has a base member 31, and projected portions 32A, 32B, 32C, and 32D. The button type operation unit 30L has a base member 31L, and projected portions 32AL, 32BL, 32CL, and 32DL. The chassis 100 has a substantially rectangular parallelepiped shape. The chassis 100 has a top surface chassis 101, and a bottom surface chassis 102. The top surface chassis 101 and the bottom surface chassis 102 are made of a material, such as a metal or resin, having high rigidity.

The top surface chassis 101 has a top surface 1101, and a side surface 1102. The top surface 1101 has a substantially rectangular planar shape seen from the top surface side. That is, the top surface 1101 has a planar surface. Top surface openings 111A, 111B, 111C, and 111D are formed near one end of the top surface 1101 in the longitudinal direction. Top surface openings 111AL, 111BL, 111CL, and 111DL are formed near the other end of the top surface 1101 in the longitudinal direction. The top surface openings 111A to 111D and 111AL to 111DL are through-holes extending the top surface 1101 therethrough in the thickness direction. The top surface openings 111A, 111B, 111C, and 111D expose the projected portions 32A, 32B, 32C, and 32D of the button type operation unit 30 to outside. The top surface openings 111AL, 111BL, 111CL, and 111DL expose the projected portions 32AL, 32BL, 32CL, and 32DL of the button type operation unit 30L to outside. Therefore, the top surface 1101 is located on the operation surface side of the tactile presentation device 10.

The side surface 1102 is formed along the peripheral edge of the top surface 1101 to be orthogonal to the planar surface of the top surface 1101. With this, the top surface chassis 101 is opened opposite to the bottom surface chassis 102. The side surface 1102 has a thickness different portion. Specifically, the portion of the side surface 1102 on the peripheral edge side of the top surface 1101 is thicker than the portion of the side surface 1102 on the center side of the top surface 1101. The portion of the side surface 1102 on the center side of the top surface 1101 has a first fixing surface 1103. The first fixing surface 1103 is parallel to the planar surface of the top surface 1101. With such a structure, the top surface chassis 101 has a top surface inner space 110A formed by the top surface 1101 and the side surface 1102. The thickness of the side surface 1102 (the dimension in the direction orthogonal to the planar surface of the top surface 1101) is appropriately determined according to each component arranged in the chassis 100.

The bottom surface chassis 102 has a bottom surface 1201, and a side surface 1202. The bottom surface 1201 has a substantially rectangular planar shape seen from the top surface side, and is opposite to the top surface 1101 of the top surface chassis 101. That is, the bottom surface 1201 has a planar surface. The side surface 1202 is formed along the peripheral edge of the bottom surface 1201 to be orthogonal to the planar surface of the bottom surface 1201. With this, the bottom surface chassis 102 is opened opposite to the top surface chassis 101. With such a structure, the bottom surface chassis 102 has a bottom surface inner space 120 formed by the bottom surface 1201 and the side surface 1202. The thickness of the side surface 1202 (the dimension in the direction orthogonal to the planar surface of the bottom surface 1201) is appropriately determined according to each component arranged in the chassis 100.

The top surface chassis 101 and the bottom surface chassis 102 having such a structure have the side surfaces 1102 and 1202 joined to each other. With this, the chassis 100 has an inner space formed so that the top surface inner space 110 and the bottom surface inner space 120 communicate with each other. Here, when the thickness of the side surface 1102 and the side surface 1202 is minimum, the chassis 100 can be low in height.

The button type operation units 30 and 30L are arranged in the inner space of the chassis 100, more specifically, in the top surface inner space 110 of the top surface chassis 101. As described above, the button type operation unit 30 has the base member 31, and the projected portions 32A, 32B, 32C, and 32D. The base member 31 has a planar shape in which two rectangular portions are orthogonal to each other in plan view (crossed shape). Therefore, the base member 31 has a center having a square shape in plan view, and four rectangular portions around the center. The projected portions 32A, 32B, 32C, and 32D are formed on the rectangular portions of the base member 31. The projected portions 32A, 32B, 32C, and 32D have a tubular shape. The projected portions 32A and 32C are symmetric with respect to the position where the rectangular portions are orthogonal to each other. The projected portions 32B and 32D are symmetric with respect to the position where the rectangular portions are orthogonal to each other.

As described above, the button type operation unit 30L has the base member 31L, and the projected portions 32AL, 32BL, 32CL, and 32DL. The base member 31L has a planar shape in which two rectangular portions are orthogonal to each other in plan view (crossed shape). Therefore, the base member 31L has a center having a square shape in plan view, and four rectangular portions around the center. The projected portions 32AL, 32BL, 32CL, and 32DL are formed on the rectangular portions of the base member 31L. The projected portions 32AL, 32BL, 32CL, and 32DL have a substantially pentagonal prism shape. The projected portions 32AL and 32CL are symmetric with respect to the position where the rectangular portions are orthogonal to each other. The projected portions 32BL and 32DL are symmetric with respect to the position where the rectangular portions are orthogonal to each other.

In the button type operation units 30 and 30L, the top surfaces of the projected portions 32A to 32D and 32AL to 32DL are operation surfaces. The button type operation units 30 and 30L are mounted on the top surface chassis 101 so that the operation surfaces are exposed from the top surface openings 111A to 111D and 111AL to 111DL of the top surface chassis 101 to outside.

Specifically, the ends of the rectangular portions of the base member 31 of the button type operation unit 30 are not exposed from the top surface openings 111A to 111D. Buffer materials 50 are arranged on the surface of the base member 31 on the side on which the projected portions 32A to 32D at the ends of the rectangular portions thereof are formed. The surfaces of the buffer materials 50 opposite to the surfaces thereof abutted onto the base member 31 are abutted onto the inner surface of the top surface 1101. Buffer materials 51 are arranged opposite to the surface of the base member 31 on the side on which the projected portions 32A to 32D at the ends of the rectangular portions thereof are formed. The surfaces of the buffer materials 51 opposite to the surfaces thereof abutted onto the base member 31 are abutted onto the surface of the reinforcement member 70. The reinforcement member 70 is fixed to the top surface chassis 101. With this structure, the button type operation unit 30 is sandwiched between the top surface 1101 of the top surface chassis 101 and the reinforcement member 70 via the buffer materials 50 and 51.

In addition, the ends of the rectangular portions of the base member 31L of the button type operation unit 30L are not exposed from the top surface openings 111AL to 111DL. The buffer materials 50 are arranged on the surface of the base member 31 on the side on which the projected portions 32AL to 32DL at the ends of the rectangular portions thereof are formed. The surfaces of the buffer materials 50 opposite to the surfaces thereof abutted onto the base member 31L are abutted onto the inner surface of the top surface 1101. The buffer materials 51 are arranged opposite to the surface of the base member 31L on the side on which the projected portions 32AL to 32DL at the ends of the rectangular portions thereof are formed. The surfaces of the buffer materials 51 opposite to the surfaces thereof abutted onto the base member 31L are abutted onto the surface of the reinforcement member 70. The reinforcement member 70 is fixed to the top surface chassis 101. With this structure, the button type operation unit 30L is sandwiched between the top surface 1101 of the top surface chassis 101 and the reinforcement member 70 via the buffer materials 50 and 51.

The buffer materials 50 are made of a material, such as a resin, having predetermined elasticity. Here, the predetermined elasticity is preferably elasticity to the extent that vibration transmitted from the actuators 20 and 20L to the button type operation units 30 and 30L can be prevented from being leaked to the chassis 100. The buffer materials 50 are bonded to at least the button type operation units 30 and 30L with e.g., an adhesive. The buffer materials 51 are made of a material having lower elasticity than the buffer materials 50. The buffer materials 51 are also bonded to at least the button type operation units 30 and 30L with e.g., an adhesive.

Each of the reinforcement members 70 is planar, and has an outer peripheral portion 71 and an inner peripheral portion 72. The outer peripheral portion 71 and the inner peripheral portion 72 have different thicknesses so that the outer peripheral portion 71 is thicker than the inner peripheral portion 72. By this thickness difference, a recess 74 having a predetermined depth (height) is formed on one surface of the reinforcement member 70. A through-hole 73 is formed at the center of the reinforcement member 70 in plan view. In other words, the through-hole 73 is formed at the center of the inner peripheral portion 72. The through-hole 73 has an opening diameter to the extent of inserting at least the pad 40 therethrough. Like the chassis 100, the reinforcement member 70 is made of a material having high rigidity. Further, the reinforcement member 70 is desirably made of an insulation material. Since the reinforcement member 70 is made of an insulation material, a driving signal applied to the actuators 20 and 20L can be prevented from being leaked to the chassis 100. With this, even when the chassis 100 is formed of a material, such as a metal, having conductivity, a driving signal can be prevented from being leaked to an operator.

The reinforcement member 70 is fixed to the top surface chassis 101 so that the surface thereof on the side on which the recess 74 is not formed is abutted onto the first fixing surface 1103. The reinforcement member 70 for the button type operation unit 30 and the reinforcement member for the button type operation unit 30L may be integral with each other. In addition, the reinforcement member 70 may be integral with the top surface chassis 101.

The actuators 20 and 20L are arranged below the button type operation units 30 and 30L. The actuators 20 and 20L have the same structure. In addition, the connection structure of the actuator 20 and the button type operation unit 30 is the same as the connection structure of the actuator 20L and the button type operation unit 30L.

The actuators 20 and 20L are piezoelectric actuators, and have planar base substrates 21 and 21L and planar piezoelectric elements 22 and 22L. That is, the actuators 20 and 20L and the base substrates 21 and 211 have planar surfaces. The base substrates 21 and 21L are formed of a 42Ni metal or stainless steel, or a glass epoxy resin. The base substrates 21 and 21L should have higher elasticity. With higher elasticity, vibration loss can be reduced. In addition, when the base substrates 21 and 21L are formed of an insulation resin, a driving signal (voltage) applied to the piezoelectric element 22 can be prevented from being leaked to the chassis 100 and the button type operation units 30 and 30L.

The piezoelectric elements 22 and 22L have planar piezoelectric bodies made of piezoelectric ceramics, and driving electrodes applying a driving signal to the piezoelectric bodies. That is, the piezoelectric bodies have planar surfaces. The piezoelectric bodies should be formed of a material containing lead zirconate titanate ceramics, and may be formed of a material containing a non-lead piezoelectric body ceramics, such as alkali niobate ceramics, such as potassium-sodium niobate. The driving electrodes are formed on the opposite planar surfaces of the piezoelectric bodies. The piezoelectric elements 22 and 22L are driven in d31 mode, and are deformed to be extended and shrunk along the planar surfaces of the piezoelectric bodies. Each of the piezoelectric elements 22 and 22L is arranged on one principal plane of the base substrate 21.

By deformation of the piezoelectric elements 22 and 22L, the actuators 20 and 20L are bent to cause vibration in the direction orthogonal to the planar surfaces of the base substrates 21 and 21L.

The actuators 20 and 20L are fixed to the reinforcement members 70 with fixing members 60, such as screws. Specifically, a plurality of through-holes are provided along the peripheral edges of the base substrates 21 and 21L, and the actuators 20 and 20L are fixed to the reinforcement members 70 with the fixing members 60 inserted through the through-holes. The actuators 20 and 20L are arranged on the reinforcement members 70 on the side on which the recesses 74 are formed. The actuators 20 and 20L are fixed to the reinforcement members 70 so that the peripheral edges of the surfaces of the base substrates 21 and 21L on the sides on which the piezoelectric elements 22 and 22L are not arranged are abutted onto the surfaces of the outer peripheral portions 71 of the reinforcement members 70.

In FIG. 2, screws are used as the fixing members 60, but adhesives or adhesive tapes may be used as the fixing members 60. The actuators 20 and 20L are held so that the planar surfaces of the base substrates 21 and 21L are substantially parallel to the surfaces of the base members 31 and 31L of the button type operation units 30 and 30L and the operation surfaces of the button type operation units 30 and 30L.

With such a structure, voids having the recesses 74 are formed between the actuators 20 and 20L and the inner peripheral portions 72 of the reinforcement members 70. In other words, the actuators 20 and 20L and the inner peripheral portions 72 of the reinforcement members 70 are spaced at a predetermined interval.

The pads 40 are arranged between the centers of the actuators 20 and 20L and the centers of the button type operation units 30 and 30L so as to be inserted through the through-holes 73 of the reinforcement members 70. The heights of the pads 40 are equal to the distances between planes including the surfaces of the base members 31 and 31L opposite to the actuators 20 and 20L and planes including the surfaces of the outer peripheral portions 71 of the reinforcement members 70 on the sides on which the actuators 20 and 20L are fixed. With this, the heights of the pads 40 are equal to the distances between planes including the surfaces of the base members 31 and 31L opposite to the actuators 20 and 20L and planes including the surfaces of the actuators 20 and 20L opposite to the sides on which the piezoelectric elements 22 and 22L are arranged.

Therefore, each of the pads 40 has one end in the height direction abutted onto the surface of each of the base members 31 and 31L of each of the button type operation units 30 and 30L opposite to each of the actuators 20 and 20L, and the other end in the height direction abutted onto each of the base substrates 21 and 21L. In this case, when the projected portions 32A to 32D of the button type operation unit 30 are not pressed by the operator and the actuator 20 is not driven, a force is not applied to between the button type operation unit 30, the pad 40, and the actuator 20. Likewise, when the projected portions 32AL to 32DL of the button type operation unit 30L are not pressed by the operator and the actuator 20L is not driven, a force is not applied to between the button type operation unit 30L, the pad 40, and the actuator 20.

The tactile presentation device 10 which has such a structure detects that any one of the projected portions 32A to 32D and 32AL to 32DL of the button type operation units 30 and 30L is pressed and operated by the finger of the operator, the actuators 20 and 20L are driven. In this case, for instance, only the actuators connected to the operated button type operation units 30 and 30L are driven. The actuators 20 and 20L which are driven transmit vibration via the pads 40 to vibrate the button type operation units 30 and 30L. That is, the pads 40 are vibration transmission members which transmit vibration from the actuators 20 and 20L to the button type operation units 30 and 30L. The vibration transmitted to the button type operation units 30 and 30L is transmitted to the operator from his/her finger which touches the projected portions 32A to 32D and 32AL to 32DL. With this, a predetermined tactile sense is presented to the operator who operates the button type operation units 30 and 30L.

In the tactile presentation device 10, the planar surfaces of the actuators 20 and 20L and the planar surfaces of the base members 31 and 31L of the button type operation units 30 and 30L are substantially parallel to each other, and the direction orthogonal to the planar surfaces is the vibration direction. Therefore, vibration from the actuators 20 and 20L can be effectively provided to the button type operation units 30 and 30L. In addition, the planar surfaces of the actuators 20 and 20L and the planar surfaces of the base members 31 and 31L of the button type operation units 30 and 30L are substantially parallel to each other, so that the chassis 100 can be thinner. The thin tactile presentation device 10 can effectively present a tactile sense.

The pads 40 should be arranged in the center positions of the actuators 20 and 20L in plan view. With this, the pads 40 are arranged in the positions where the amplitudes of vibration in the actuators 20 and 20L are maximum, so that the vibration can be transmitted to the button type operation units 30 and 30L more effectively. Further, the centers of the button type operation units 30 and 30L in plan view and the centers of the actuators 20 and 20L in plan view substantially coincide with each other in the chassis 100 in top view. With this, the vibration can be transmitted to the button type operation units 30 and 30L more effectively. Therefore, a tactile sense can be presented more effectively.

In the structure body having a plurality components like the tactile presentation device, manufacture variation in the components can influence its characteristic and reliability. As described in the above problems, in the tactile presentation device, the position relation between the actuator and the operation input unit, such as a touch panel or button, is important. The influence of manufacture variation in the actuator 20 of the tactile presentation device 10 according to this embodiment will be described. The description of the actuator 20L to which the same concept as the actuator 20 is applicable is omitted.

Figure 3:
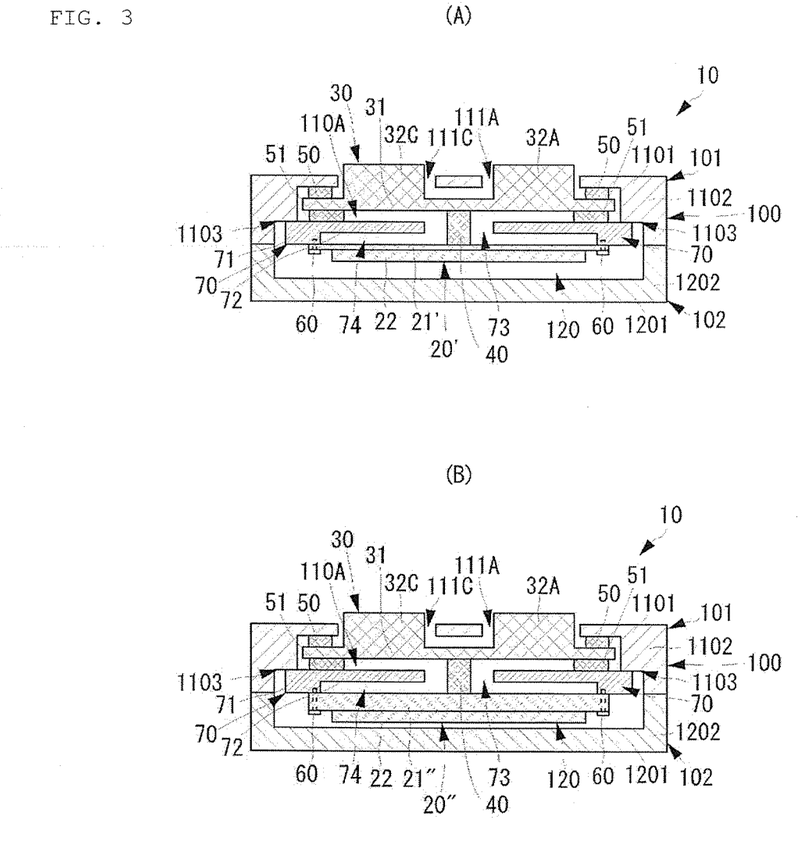
FIGS. 3A and 3B are diagrams of assistance in explaining the tactile presentation device 10 according to the first embodiment of the present invention which is not influenced by manufacture variation in actuators.

FIGS. 3A and 3B are diagrams of assistance in explaining the tactile presentation device 10 according to this embodiment which is not influenced by manufacture variation in actuators. In FIG. 3A, a base substrate 21' of an actuator 20' is thinner than a desired thickness. In FIG. 3B, a base substrate 21" of an actuator 20" is thicker than a desired thickness. Like FIG. 2, FIGS. 3A and 3B show the cross sections of the tactile presentation device 10 in a plane parallel to the side surface thereof.

As described above, in the tactile presentation device 10, the actuator 20 is mounted on the top surface chassis 101 on which the button type operation unit 30 is mounted. The actuator 20 is mounted so that the peripheral edge of the surface of the base substrate 21 on the side on which the piezoelectric element 22 is not arranged is abutted onto the surface of the outer peripheral portion 71 of the reinforcement member 70. Even when the base substrate 21' of the actuator 20' is thinner than the desired thickness as shown in FIG. 3A and even when the base substrate 21" of the actuator 20" is thicker than the desired thickness as shown in FIG. 3B, the distance between a plane including the surface of the base member 31 opposite to the actuator and a plane including the surface of the actuator on the side on which the piezoelectric element 22 is not arranged is not changed.

Therefore, the distance between a plane including the surface of the base member 31 opposite to the actuator and a plane including the surface of the actuator on the side on which the piezoelectric element 22 is not arranged always coincide with the height of the pad 40. With this, unlike the conventional tactile presentation device, the problem that vibration cannot be transmitted to the operation input unit without the actuator being contacted with the pad due to manufacture variation in the base substrate of the actuator and the problem that the actuator to which a load is applied is warped and broken do not arise. As a result, a tactile sense can be reliably presented. The tactile presentation device 10 can thus have high reliability.

The pads 40 are arranged so that the ends thereof are abutted onto the centers of the actuators 20 and 20L, and gaps may be formed between the top surfaces of the pads 40 and the surfaces of the base members 31 and 31L on the sides opposite to the actuators 20 and 20L. That is, the heights of the pads 40 may be less than the distances between planes including the surfaces of the base members 31 and 31L on the sides opposite to the actuators 20 and 20L and planes including the surfaces of the actuators 20 and 20L opposite to the sides on which the piezoelectric elements 22 and 22L are arranged, and the top surfaces of the pads 40 and the surfaces of the base members 31 and 31L opposite to the actuators 20 and 20L may be contacted with each other when any one of the projected portions 32A to 32D and 32AL to 32DL of the button type operation units 30 and 30L is pressed by the finger of the operator. In this case, the problem that vibration cannot be transmitted to the operation input unit without the actuator being contacted with the pad due to manufacture variation in the base substrate of the actuator and the problem that the actuator to which a load is applied is warped and broken do not arise. In addition, variation in the distance between a plane including the surface of the base member of the button type operation unit opposite to the actuator and a plane including the surface of the actuator opposite to the side on which the piezoelectric element is arranged, which is caused due to manufacture variation in the button type operation unit and variation in assembling accuracy at the time of mounting the button type operation unit on the top surface of the top surface chassis can be solved.

Figure 4:
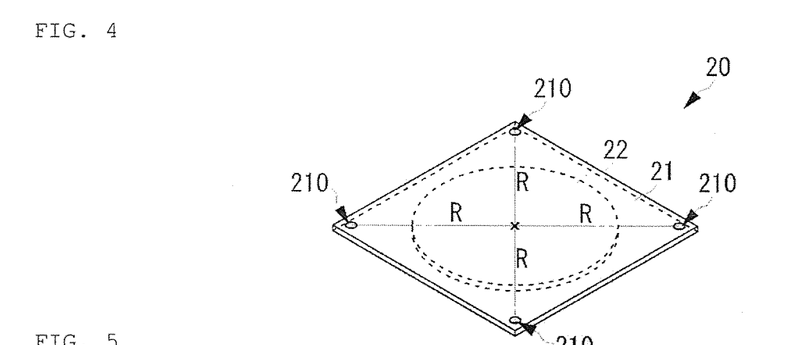
FIG. 4 is an appearance perspective view of an actuator 20 structuring the tactile presentation device 10 according to the first embodiment of the present invention.

The actuators 20 and 20L should be mounted on the top surface chassis 101 by using the following structure. The description of the actuator 20L to which the same concept as the actuator 20 is applicable is omitted. FIG. 4 is an appearance perspective view of the actuator 20 structuring the tactile presentation device 10 according to the first embodiment of the present invention.

The base substrate 21 of the actuator 20 is substantially square in plan view. The piezoelectric element 22 is circular in plan view. The center of the piezoelectric element 22 in plan view and the center of the base substrate 21 in plan view coincide with each other. In other words, the center of the piezoelectric element 22 in plan view and the center of the base substrate 21 in plan view coincide with the center of the actuator 20 in plan view.

Fixing through-holes 210 are formed in the base substrate 21. The fixing through-holes 210 are formed near four corners of the base substrate 21 in plan view. Distances R from the center of the base substrate 21 in plan view to the fixing through-holes 210 are the same. The actuator 20 is fixed to the reinforcement member 70 with the fixing members (screws) 60 inserted through the fixing through-holes 210. In FIG. 4, the four fixing through-holes 210 are formed, but the present invention is not limited to this.

Figure 5:
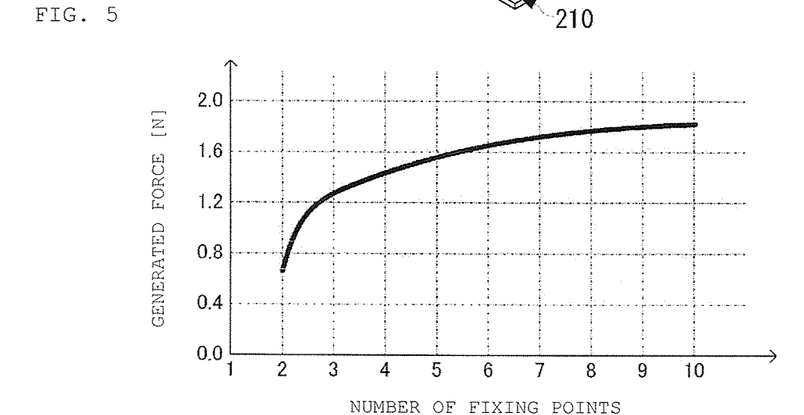
FIG. 5 is a graph showing the relation between the number of fixing points and the generated force in a button type operation unit 30 in the tactile presentation device 10 according to the first embodiment of the present invention.

FIG. 5 is a graph showing the relation between the number of fixing points and the generated force in the button type operation unit 30 in the tactile presentation device 10 according to the first embodiment of the present invention. Here, the fixing points are points at which the actuator 20 is fixed to the reinforcement member 70, specifically, the fixing through-holes 210. In FIG. 5, when the generated force in the button type operation unit 30 is large, vibration from the actuator 20 is transmitted to the button type operation unit 30 at small loss. As shown in FIG. 5, as the number of fixing points is larger, the generated force in the button type operation unit 30 is increased. However, as the number of fixing points is larger, the area required for fixing the base substrate 21 is increased, which is disadvantageous for size reduction. Therefore, as seen from FIG. 5, since the increase amount of the generated force in the button type operation unit 30 with respect to the increase of the number of fixing points is gradually decreased, the number of fixing points should be set to a minimum value, if necessary, to the extent that a necessary generated force can be obtained. This can cope with ensuring of the necessary generated force and size reduction.

In FIG. 5, the fixing points are arranged in turning symmetry with respect to the center of the actuator 20 in plan view. The fixing points are arranged in turning symmetry, so that the above effect can be reliably obtained.

As shown in FIG. 4, distances R from the center of the base substrate 21 in plan view to the fixing points (fixing through-holes 210) are desirably the same. This is because the generated force in the button type operation unit 30 is influenced by the fixing point located in the shortest distance from the center of the base substrate 21 in plan view, so that the generated force is influenced by the number of fixing points in the distance.

The fixing members 60 are screws in the result of FIG. 5, but the same operation and effect can be obtained even by another fixing method. For instance, the number of adhesive tapes as the fixing members 60 in which the distances from the center of the base substrate 21 in plan view are constant and the number of the application locations of adhesives as the fixing members 60 in which the distances from the center of the base substrate 21 in plan view are constant correspond to the number of fixing points.

With the same magnitude (voltage) of a driving signal, as the distance from the center of the base substrate 21 in plan view is longer, the amplitude of vibration from the actuator 20 is increased. On the other hand, as the distance from the base substrate 21 in plan view is longer, the generated force is decreased. In consideration of these conditions, distances R from the center of the base substrate 21 in plan view to the fixing points (fixing through-holes 210) should be set so that the button type operation unit 30 can provide vibration necessary for the tactile presentation device 10.

Figure 6:
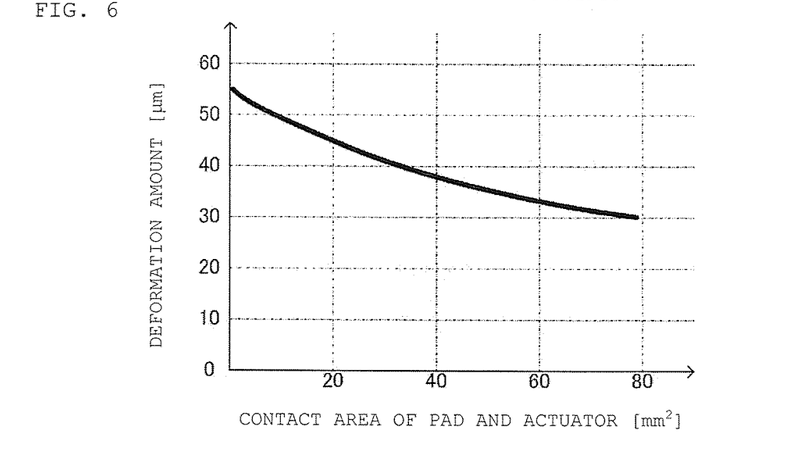
FIG. 6 is a graph showing the relation between the contact area of a pad 40 and the actuator 20 and the deformation amount provided to the button type operation unit 30 in the tactile presentation device 10 according to the first embodiment of the present invention.

The contact area of the pad 40 and the actuator 20 should be set, if necessary. FIG. 6 is a graph showing the relation between the contact area of the pad 40 and the actuator 20 and the deformation amount provided to the button type operation unit 30. As shown in FIG. 6, as the contact area of the pad 40 and the actuator 20 is smaller, the deformation amount provided to the button type operation unit 30 is increased. In this point, the contact area of the pad 40 and the actuator 20 should be minimum. However, when the contact area of the pad 40 and the actuator 20 is too small, the pad 40 becomes very small. Consequently, handling becomes difficult, so that the operation efficiency at the time of manufacture can be lowered. Therefore, actually, the shape of the pad 40 should be determined so that the contact area of the pad 40 and the actuator 20 is approximately 1 mm$^2$.

Fixing of the actuator 20 and installation of the pad 40 are set more strictly, so that the tactile presentation device can provide the above operation and effect, such as reliability and present a tactile sense more efficiently.

Figure 7:
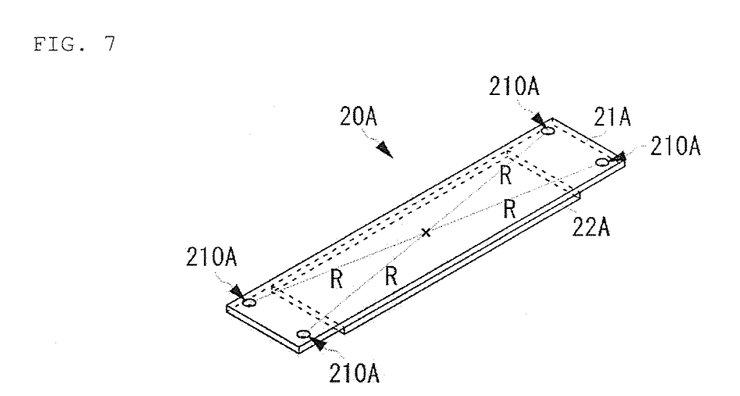
FIG. 7 is an appearance perspective view of a modification example of the tactile presentation device 10 according to the first embodiment of the present invention and an actuator 20A having a structure different from the actuator 20.

FIG. 4 shows the actuator 20 in which the circular piezoelectric element 22 in plan view is arranged on the substantially square base substrate 21 in plan view, but an actuator 20A having the shape shown in FIG. 7 may be used. FIG. 7 is an appearance perspective view of a modification example of the tactile presentation device 10 according to the first embodiment of the present invention and the actuator 20A having a structure different from the actuator 20. The actuator 20A has a base substrate 21A, and a piezoelectric element 22A. The base substrate 21A is rectangular in plan view. The piezoelectric element 22A is rectangular in plan view. The piezoelectric element 22A is arranged on one principal plane of the base substrate 21A. The length of the piezoelectric element 22A is shorter than the length of the base substrate 21A. The width of the piezoelectric element 22A is substantially the same as the width of the base substrate 21A. The center of the piezoelectric element 22A in plan view and the center of the base substrate 21A in plan view substantially coincide with each other. Fixing through-holes 210A are formed in the base substrate 21A. The fixing through-holes 210A are formed near four corners of the base substrate 21A in plan view. Distances R from the center of the base substrate 21A in plan view to the fixing through-holes 210A are the same. Even with such a structure, the same operation and effect as the actuator 20 can be obtained.

In the structure of this embodiment, the following effect can be obtained. The intervals between the base members 31 and 31L of the button type operation units 30 and 30L and the reinforcement members 70 are equal to or less than the maximum allowable warping amount of the actuators 20 and 20L. In addition, the intervals between the inner peripheral portions 72 of the reinforcement members 70 and the actuators 20 and 20L (the depths of the recesses 74) are also equal to or less than the maximum allowable warping amount of the actuators 20 and 20L.

The maximum allowable warping amount means the critical bending amount (the length in the direction orthogonal to the planar surfaces) in which the piezoelectric bodies structuring the piezoelectric elements 22 and 22L are broken when the piezoelectric elements 22 and 22L structuring the actuators 20 and 20L are bent in the direction orthogonal to the planar surfaces. That is, when bending greater than the maximum allowable warping amount is caused, the piezoelectric body is broken.

However, the intervals between the base members 31 and 31L of the button type operation units 30 and 30L and the reinforcement members 70 are equal to or less than the maximum allowable warping amount of the actuators 20 and 20L, so that the sinking amount of the base members 31 and 31L of the button type operation units 30 and 30L is regulated by the reinforcement members 70. With this, bending of the actuators 20 and 20L by the pressing force caused by sinking of the base members 31 and 31L of the button type operation units 30 and 30L is equal to or less than the maximum allowable warping amount of the actuators 20 and 20L. Therefore, even when such a pressing force is applied, the piezoelectric bodies of the actuators 20 and 20L can be prevented from being broken. In this case, the distances between the piezoelectric elements 22 and 22L and the inner surface of the bottom surface chassis 102 are more than the maximum allowable warping amount of the actuators 20 and 20L, which can prevent contact of the piezoelectric elements 22 and 22L with the bottom surface chassis 102 due to bending of the actuators 20 and 20L by the pressing force caused by sinking of the base members 31 and 31L of the button type operation units 30 and 30L. Therefore, breakage of the piezoelectric bodies due to bending of the actuators 20 and 20L can be prevented more reliably.

When a shock is applied from outside, the actuators 20 and 20L can be bent to the button type operation units 30 and 30L. However, when the intervals between the actuators 20 and 20L and the inner peripheral portions 72 of the reinforcement members 70 are equal to or less than the maximum allowable warping amount of the actuators 20 and 20L, the warping amount of the actuators 20 and 20L is regulated by the inner peripheral portions 72 of the reinforcement members 70. With this, bending of the actuators 20 and 20L by the external force is equal to or less than the maximum allowable warping amount of the actuators 20 and 20L. Therefore, even when such an external force is applied, the piezoelectric bodies of the actuators 20 and 20L can be prevented from being broken. In this case, even when the actuators 20 and 20L are bent, the piezoelectric elements 22 and 22L cannot be contacted with the reinforcement members 70. Therefore, breakage of the piezoelectric bodies due to bending of the actuators 20 and 20L can be prevented more reliably. In addition, when gaps are formed between the top surfaces of the pads 40 and the surfaces of the base members 31 and 31L on the sides opposite to the actuators 20 and 20L, the intervals obtained by subtracting, from the heights of the pads 40, the distances between the actuators 20 and 20L and the reinforcement members 70 and the thicknesses of the reinforcement members 70 are equal to or less than the maximum allowable warping amount of the actuators 20 and 20L. Breakage of the piezoelectric bodies due to bending of the actuators 20 and 20L can thus be reliably prevented.

Figure 8:
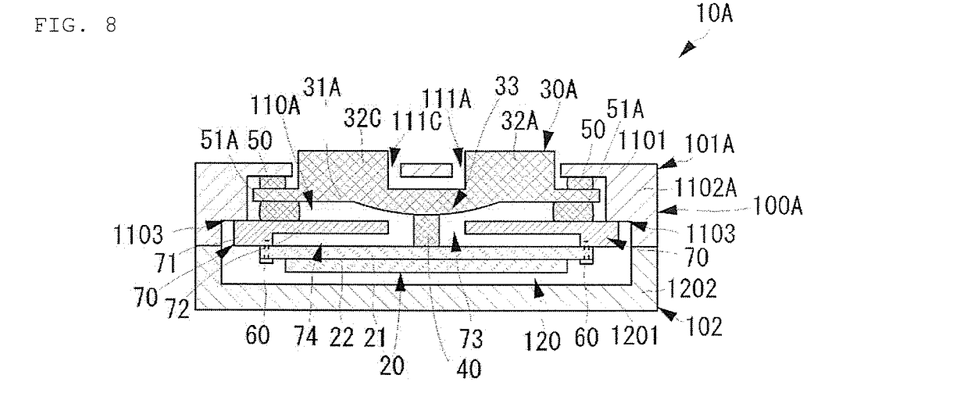
FIG. 8 is a cross-sectional view showing the structure of a tactile presentation device 10A according to a second embodiment of the present invention.

A tactile presentation device 10A according to a second embodiment of the present invention will be described with reference to the drawing. FIG. 8 is a cross-sectional view showing the structure of the tactile presentation device 10A according to the second embodiment of the present invention. FIG. 8 shows the cross section of the tactile presentation device 10A in a plane parallel to the side surface thereof.

The tactile presentation device 10A according to this embodiment shown in FIG. 8 has almost the same structure as the tactile presentation device 10 according to the first embodiment except that the structures of a chassis 100A, a button type operation unit 30A, and a buffer material 51A are different.

The button type operation unit 30A has a base member 31A, and projected portions 32A to 32D. A raised portion 33 is formed on the surface of the base member 31A opposite to the side on which the projected portions 32A to 32D are formed. The raised portion 33 has an outer diameter shape in which a portion of the spherical surface thereof is cut away. The most raised position of the raised portion 33 substantially coincides with the position of the center of the base member 31A.

The most raised position of the raised portion 33 of the button type operation unit 30A is abutted onto the pad 40. In this case, the raised portion 33 and the pad 40 are not bonded to each other. Further, preferably, the friction between the surface of the raised portion 33 and the pad 40 is reduced so that the raised portion 33 is slid on the surface of the pad 40.

The chassis 100A has a top surface chassis 101A, and the bottom surface chassis 102. The bottom surface chassis 102 is the same as the tactile presentation device 10 according to the first embodiment. A side surface 1102A of the top surface chassis 101A is higher (thicker) than the side surface 1102 of the top surface chassis 101 shown in the first embodiment. In addition, the thickness of the buffer material 51A is adjusted, if necessary, according the height of the raised portion 33.

Figure 9:
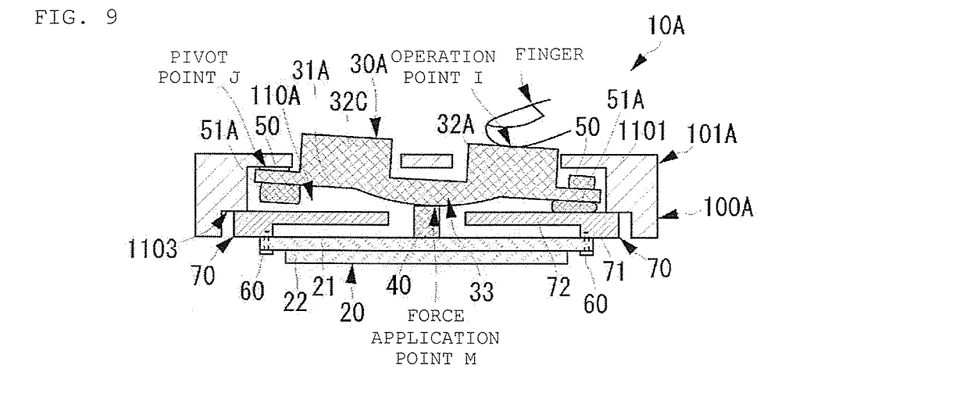
FIG. 9 is a cross-sectional view of a state where an operator presses a projected portion 32A of a button type operation unit 30A of the tactile presentation device 10A.

Even such a structure can obtain the above effect and the following further effect. FIG. 9 is a cross-sectional view of a state where the operator presses the projected portion 32A of the button type operation unit 30A of the tactile presentation device 10A. Like FIG. 8, FIG. 9 shows the cross section of the tactile presentation device 10A in a plane parallel to the side surface thereof. In FIG. 9, the bottom surface chassis 102 is omitted.

As shown in FIG. 9, when the projected portion 32A of the button type operation unit 30A is pressed by the finger of the operator, the button type operation unit 30A is sunk into the chassis 101A. Since the pad 40 and the raised portion 33 are not bonded to each other, the raised portion 33 is slid on the surface of the pad 40 to turn the button type operation unit 30A about the direction orthogonal to the cross section of the side surface. More specifically, the projected portion 32A of the button type operation unit 30A is sunk into the chassis 101A to further project the projected portion 32C from the chassis 101A to outside. Here, when the elastic limit (deformation limit) of the buffer material 50 is exceeded, turning of the button type operation unit 30A is stopped.

Force application point M is the contact point of the pad 40 and the raised portion 33 with respect to vibration from the actuator 20 when the button type operation unit 30A is fixed. In addition, pivot point J is the point at which the end of the base member 31A of the button type operation unit 30A on the projected portion 32C side is contacted with the inner surface of the top surface chassis 101A via the buffer material 50. With this, operation point I is the point at which the finger of the operator touches the projected portion 32A.

With this, vibration from the actuator 20 is effectively transmitted to the finger of the operator via the pad 40 and the button type operation unit 30A. Therefore, a tactile sense can be presented more efficiently than the tactile presentation device 10 shown in the first embodiment.

Figure 10:
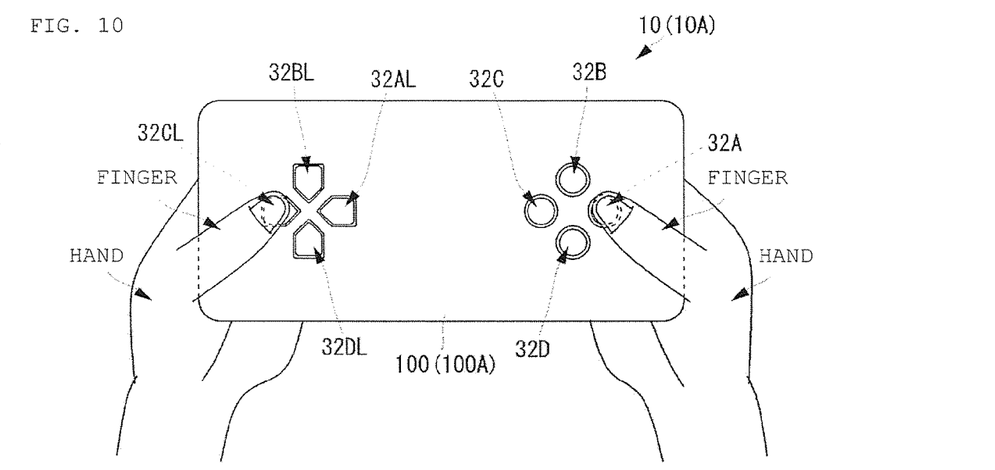
FIG. 10 is a diagram showing a form in which the operator handles the tactile presentation device according to the embodiment of the present invention.

Such a tactile presentation device is used for e.g., a game controller, and as shown in FIG. 10, is often handled by the operator. FIG. 10 is a diagram showing a form in which the operator handles the tactile presentation device. As shown in FIG. 10, the operator holds the tactile presentation device 10 (10A) in both hands. Then, the operator presses the button type operation units 30 (30A) and 30L by the thumbs of both hands. In this case, generally, the operator selects and presses one projected portion of the button type operation units 30 (30A) and 30L according to the contents to be operated. Therefore, typically, one projected portion in the button type operation units 30 (30A) and 30L is pressed by the finger of the operator.

In the above structure, in the button type operation units 30 (30A), vibration is transmitted, not only to the projected portion (e.g., the projected portion 32A) pressed by the finger of the operator, but also to the projected portions (e.g., the projected portions 32B, 32C, and 32D) not pressed by the finger of the operator. However, vibration should be transmitted to at least one projected portion which is touched by the finger of the operator. Therefore, even when vibration is transmitted to the unpressed projected portions, a tactile sense cannot be provided to the operator via the unpressed projected portions. That is, in the tactile sense, vibration can be obtained only from the operated and pressed projected portion.

Figure 11:
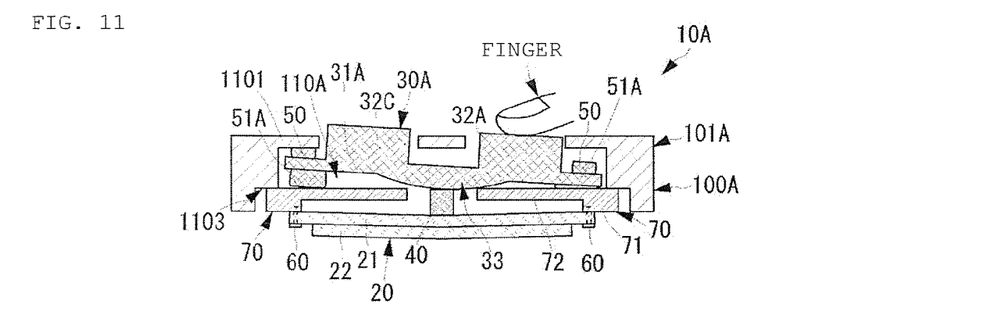
FIG. 11 is a cross-sectional view showing a state where the projected portion 32A of the button type operation unit 30A of the tactile presentation device 10A according to the second embodiment of the present invention is strongly pressed by the finger of the operator.

In addition, in the tactile presentation device 10A according to the second embodiment, even when any one of the projected portions 32A to 32D of the button type operation unit 30A is strongly pressed as shown in the first embodiment, the actuator 20 can be protected like the first embodiment. FIG. 11 is a cross-sectional view showing a state where the projected portion 32A of the button type operation unit 30A of the tactile presentation device 10A according to the second embodiment of the present invention is strongly pressed by the finger of the operator.

As shown in FIG. 11, when the projected portion 32A of the button type operation unit 30A is pressed by the finger of the operator, for instance, the raised portion 33 is abutted onto the reinforcement member 70 while the button type operation unit 30A is turned. Therefore, the distance in which any one of the projected portions 32A to 32D of the button type operation unit 30A is pressed to abut the raised portion 33 onto the reinforcement member 70 is set to equal to or less than the maximum allowable warping amount. With this, even when the button type operation unit 30A is excessively pressed, the actuator 20 can be prevented from being broken.

Figure 12:
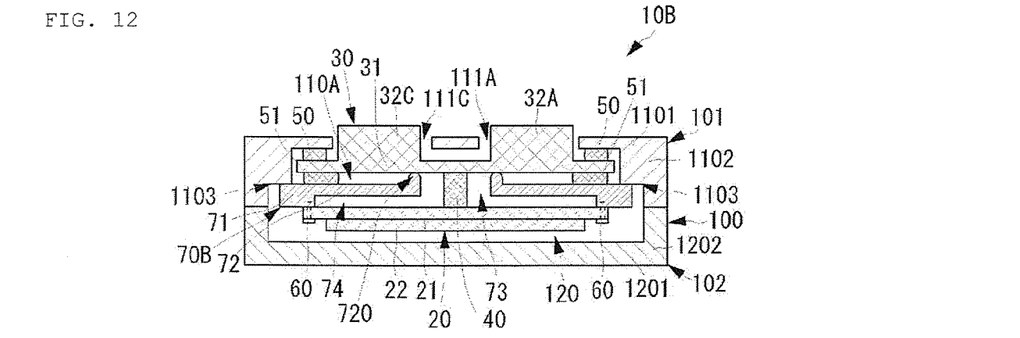
FIG. 12 is a cross-sectional view showing the structure of a tactile presentation device 10B according to a third embodiment of the present invention.

A tactile presentation device 10B according to a third embodiment of the present invention will be described with reference to the drawing. FIG. 12 is a cross-sectional view showing the structure of the tactile presentation device 10B according to the third embodiment of the present invention. FIG. 12 shows the cross section of the tactile presentation device 10B in a plane parallel to the side surface thereof.

The tactile presentation device 10B according to this embodiment shown in FIG. 12 has almost the same structure as the tactile presentation device 10 according to the first embodiment except that the structure of a reinforcement member 70B is different.

The reinforcement member 70B is planar like the reinforcement member 70, and has the outer peripheral portion 71 and the inner peripheral portion 72. The outer peripheral portion 71 and the inner peripheral portion 72 have different thicknesses so that the outer peripheral portion 71 is thicker than the inner peripheral portion 72. By this thickness difference, the recess 74 having a predetermined depth (height) is formed on one surface of the reinforcement member 70. The through-hole 73 is formed at the center of the reinforcement member 70B in plan view. In other words, the through-hole 73 is formed at the center of the inner peripheral portion 72. The reinforcement member 70B has a raised portion 720 surrounding the through-hole 73. The raised portion 720 has the same height as the interval between the planar surface of the reinforcement member 70B (the surface opposite to the base member 31 of the button type operation unit 30) and the surface of the base member 31 of the button type operation unit 30 opposite to the reinforcement member 70B. The end of the raised portion 720 has a semi-circular cross section. By such a structure, like the second embodiment, with the end of the raised portion 720 as a pivot point, the button type operation unit 30 can be turned.

With the use of the structure of this embodiment, the button type operation unit 30 can be turned, and like the second embodiment, a tactile sense can be effectively presented.

Figure 13:
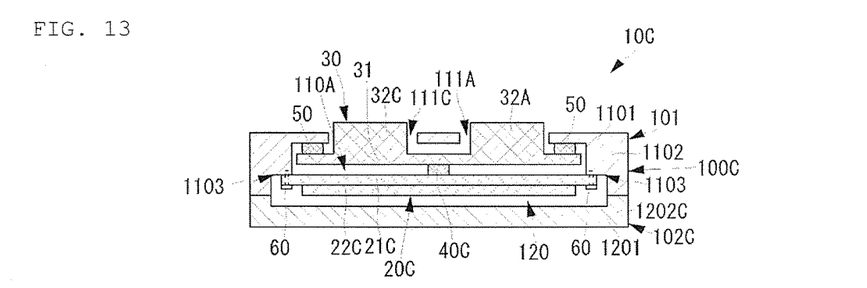
FIG. 13 is a cross-sectional view showing the structure of a tactile presentation device 10C according to a fourth embodiment of the present invention.

A tactile presentation device 100 according to a fourth embodiment of the present invention will be described with reference to the drawing. FIG. 13 is a cross-sectional view showing the structure of the tactile presentation device 100 according to the fourth embodiment of the present invention. FIG. 13 shows the cross section of the tactile presentation device 100 in a plane parallel to the side surface thereof.

The tactile presentation device 100 according to this embodiment shown in FIG. 13 has almost the same structure as the tactile presentation device 10 according to the first embodiment except that the reinforcement member 70 is omitted.

A chassis 100C has the top surface chassis 101, and a bottom surface chassis 102C. The top surface chassis 101 is the same as the tactile presentation device 10 according to the first embodiment. A side surface 1202C of the bottom surface chassis 102C is lower than the side surface 1202 of the bottom surface chassis 102 shown in the first embodiment. An actuator 20C is a piezoelectric actuator, and has a planar base substrate 21C and a planar piezoelectric element 22C. The actuator 20C is fixed to the first fixing surface 1103 of the top surface chassis 101 with the fixing members 60, such as screws. The actuator 20C is fixed to the top surface chassis 101 so that the peripheral edge of the surface of the base member 21C on the side on which the piezoelectric element 22C is not arranged is abutted onto the first fixing surface 1103. The actuator 20C is fixed to the top surface chassis 101 so that the piezoelectric element 22C is arranged on the surface thereof opposite to the surface thereof opposite to the button type operation unit 30.

A pad 40C is arranged between the center of the actuator 20C and the center of the button type operation unit 30. The height of the pad 40 is equal to the distance between a plane including the surface of the base member 31 of the button type operation unit 30 opposite to the actuator 20C and a plane including the surface of the base substrate 21C of the actuator 20C opposite to the surface thereof on the side on which the piezoelectric element 22C is arranged. In addition, the height of the pad 40C is equal to the distance between a plane including the surface of the base member 31 of the button type operation unit 30 opposite to the actuator 20C and a plane including the first fixing surface 1103 of the top surface chassis 101.

The pad 40C is arranged so that the end thereof is abutted onto the center of the actuator 20C, and a gap may be formed between the top surface of the pad 40C and the surface of the base member 31 opposite to the actuator 20C. That is, the height of the pad 40C may be less than the distance between a plane including the surface of the base member 31 opposite to the actuator 20C and a plane including the surface of the actuator 20C opposite to the side on which the piezoelectric element 22C is arranged, and the top surface of the pad 40C may be contacted with the surface of the base member 31 opposite to the actuator 20C when any one of the projected portions 32A to 32D of the button type operation unit 30 is pressed by the finger of the operator.

Even with such a structure, the problem that vibration cannot be transmitted to the button type operation unit without the actuator being contacted with the pad due to manufacture variation and the problem that the actuator to which a load is applied is warped and broken can be solved.

DESCRIPTION OF REFERENCE SYMBOLS 10, 10A, 10B, 100: Tactile presentation device
20, 20', 20'', 20A, 20C, 20L: Actuator
21, 21', 21'', 21A, 21C, 21L: Base substrate
22, 22A, 22C, 22L: Piezoelectric element
30, 30A, 30L: Button type operation unit
31, 31A, 31L: Base member
32A to 32D, 32AL to 32DL: Projected portion
33: Raised portion
40, 40C: Pad
50, 51, 51A: Buffer material
60: Fixing member
70, 70B: Reinforcement member
71: Outer peripheral portion
72: Inner peripheral portion
73: Through-hole
74: Recess
720: Raised portion
100, 100A, 100C: Chassis
101, 101A: Top surface chassis
110A: Top surface inner space
111A to 111D, 111AL to 111DL: Top surface opening
102, 102C: Bottom surface chassis
120: Bottom surface inner space
1101: Top surface
1102, 1102A, 1202, 1202C: Side surface
1103: First fixing surface
1201: Bottom surface

The invention claimed is:
1. A tactile presentation device comprising:
a chassis including:
an upper frame with a top surface having a plurality of openings and a side surface extending perpendicularly from a peripheral edge of the top surface, and
a lower frame coupled to the upper frame to define an inner space therebetween;
an operation unit coupled to the top surface of the upper frame of the chassis, such that the operation unit is disposed in the inner space of the chassis and has a plurality of buttons extending through the plurality of openings of the top surface, respectively;
an actuator coupled to the side surface of the upper frame and disposed in the inner space of the chassis, the actuator including a piezoelectric element and a base substrate; and
a vibration transmission member disposed between the actuator and the operation unit the vibration transmission member including a first end abutted to the operation unit and a second end abutted to the actuator,
wherein the vibration transmission member has a height that is equal to a distance between a first plane defined by a surface of the operation unit opposite the buttons and a second plane defined by a surface of the base substrate of the actuator.

2. The tactile presentation device according to claim 1, wherein the actuator comprises a planar surface and a portion of the planar surface opposite to the operation unit is coupled to the side surface of the upper frame.

3. The tactile presentation device according to claim 2, wherein the operation unit has a planar base member,
wherein the planar surface of the actuator is substantially parallel to the planar base member of the operation unit, and
wherein the actuator is configured to vibrate in a direction orthogonal to the planar surface of the actuator.

4. The tactile presentation device according to claim 3, wherein the base member of the operation unit has a raised portion at a center portion thereof that is opposite to the actuator.

5. The tactile presentation device according to claim 1,
wherein the vibration transmission member is abutted to a center position of the actuator, and
wherein a peripheral edge of the actuator is coupled to the side surface of the upper frame of the chassis.

6. The tactile presentation device according to claim 1, wherein the vibration transmission member comprises an insulating material.

7. A tactile presentation device comprising:
a chassis including:
an upper frame with a top surface having a plurality of openings and a side surface extending perpendicularly from a peripheral edge of the top surface, and
a lower frame coupled to the upper frame to define an inner space therebetween;
an operation unit coupled to the top surface of the upper frame of the chassis, such that the operation unit is disposed in the inner space of the chassis and has a plurality of buttons extending through the plurality of openings of the top surface, respectively;
an actuator coupled to the side surface of the upper frame and disposed in the inner space of the chassis; and
a vibration transmission member disposed between the actuator and the operation unit,
wherein the side surface of the upper frame includes:
an outer surface extending perpendicularly from the peripheral edge of the top surface of the upper frame,
an inner surface extending perpendicularly from a portion of the top surface interior to the peripheral edge, with the inner surface extending parallel to the outer surface, and
a fixing surface extending perpendicular from the inner surface towards the outer surface and parallel to the top surface of the upper frame.

8. The tactile presentation device according to claim 7, wherein a peripheral edge of the actuator is coupled to the fixing surface.

9. The tactile presentation device according to claim 8, wherein the vibration transmission member comprises a height equal to a distance between a first plane defined by a surface of the operation unit opposite to the actuator and a second plane defined by the fixing surface.

10. The tactile presentation device according to claim 8, wherein the vibration transmission member comprises a height less than a distance between a first plane defined by a surface of the operation unit opposite to the actuator and a second plane defined by the fixing surface.

11. A tactile presentation device comprising:
a chassis including:
an upper frame with a top surface having a plurality of openings and a side surface extending perpendicularly from a peripheral edge of the top surface, and
a lower frame coupled to the upper frame to define an inner space therebetween, an operation unit coupled to the top surface of the upper frame of the chassis, such that the operation unit is disposed in the inner space of the chassis and has a plurality of buttons extending through the plurality of openings of the top surface, respectively;
an actuator coupled to the side surface of the upper frame and disposed in the inner space of the chassis;
a vibration transmission member disposed between the actuator and the operation unit and
a reinforcement member disposed between the actuator and the operation unit and having a through-hole in which the vibration transmission member is disposed therethrough.

12. The tactile presentation device according to claim 11, wherein the actuator is coupled to the side surface of the upper frame of the chassis via the reinforcement member.

13. The tactile presentation device according to claim 11, wherein a first space between the actuator and the reinforcement member and a second space between the operation unit and the reinforcement member, and an interval obtained by subtracting the distance between the actuator and the reinforcement member and the thickness of the reinforcement member from a height of the vibration transmission member, are equal to or less than a maximum allowable warping amount of the actuator.

14. The tactile presentation device according to claim 11, wherein the reinforcement member is integral with the side surface of the upper frame of the chassis.

15. The tactile presentation device according to claim 11, wherein the reinforcement member comprises a raised portion that is abutted to the button type operation unit.

16. The tactile presentation device according to claim 11,
wherein a first surface of the reinforcement member is coupled to the side surface of the upper frame of the chassis, and
wherein a second surface of the reinforcement member is coupled to the actuator.

17. A tactile presentation device comprising:
a chassis including:
an upper frame with a top surface having a plurality of openings and a side surface extending perpendicularly from a peripheral edge of the top surface, and
a lower frame coupled to the upper frame to define an inner space therebetween;
an operation unit coupled to the top surface of the upper frame of the chassis, such that the operation unit is disposed in the inner space of the chassis and has a plurality of buttons extending through the plurality of openings of the top surface, respectively;
an actuator coupled to the side surface of the upper frame and disposed in the inner space of the chassis, the actuator including a piezoelectric element and a base substrate; and
a vibration transmission member disposed between the actuator and the operation unit, the vibration transmission member including a first end abutted to the operation unit and a second end abutted to the actuator,
wherein the vibration transmission member has a height that is equal to or less than a distance between a first plane defined by a surface of the operation unit opposite the buttons and a second plane defined by a surface of the base substrate of the actuator.

* * * * *